(12) United States Patent
Nakatani et al.

(10) Patent No.: US 11,780,994 B2
(45) Date of Patent: Oct. 10, 2023

(54) RUBBER COMPOSITION, TREAD RUBBER, AND TIRE

(71) Applicant: BRIDGESTONE CORPORATION, Tokyo (JP)

(72) Inventors: Kenji Nakatani, Tokyo (JP); Kentaro Kumaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 262 days.

(21) Appl. No.: 17/282,557

(22) PCT Filed: Oct. 4, 2019

(86) PCT No.: PCT/JP2019/039404
§ 371 (c)(1),
(2) Date: Apr. 2, 2021

(87) PCT Pub. No.: WO2020/071557
PCT Pub. Date: Apr. 9, 2020

(65) Prior Publication Data
US 2021/0380786 A1    Dec. 9, 2021

(30) Foreign Application Priority Data

Oct. 4, 2018  (JP) .................................. 2018-189549

(51) Int. Cl.
| | | |
|---|---|---|
| C08L 9/06 | (2006.01) | |
| C08L 7/00 | (2006.01) | |
| C08L 15/00 | (2006.01) | |
| B60C 1/00 | (2006.01) | |
| C08C 19/25 | (2006.01) | |
| C08F 136/06 | (2006.01) | |
| C08F 136/08 | (2006.01) | |
| C08K 3/04 | (2006.01) | |
| C08K 3/36 | (2006.01) | |

(52) U.S. Cl.
CPC .............. *C08L 9/06* (2013.01); *B60C 1/0016* (2013.01); *C08C 19/25* (2013.01); *C08F 136/06* (2013.01); *C08F 136/08* (2013.01); *C08K 3/04* (2013.01); *C08K 3/36* (2013.01); *C08L 7/00* (2013.01); *C08L 15/00* (2013.01); *C08L 2205/025* (2013.01); *C08L 2205/035* (2013.01); *C08L 2205/08* (2013.01)

(58) Field of Classification Search
CPC .... C08L 9/06; C08L 7/00; C08L 15/00; C08L 19/25
USPC ........................................................ 523/156
See application file for complete search history.

(56) References Cited

U.S. PATENT DOCUMENTS

| | | |
|---|---|---|
| 10,518,581 B2 | 12/2019 | Higa et al. |
| 2018/0312002 A1 | 11/2018 | Sakurai |
| 2018/0319960 A1 | 11/2018 | Saji et al. |
| 2019/0203021 A1 | 7/2019 | Kyo et al. |

FOREIGN PATENT DOCUMENTS

| | | | |
|---|---|---|---|
| EP | 3 608 362 A1 | 2/2020 | |
| JP | 08-027313 A | 1/1996 | |
| JP | 2014-205842 A | 10/2014 | |
| JP | 2017-002189 A | 1/2017 | |
| JP | 2017-190457 A | 10/2017 | |
| JP | 2018-028018 A | 2/2018 | |
| WO | WO-2016133202 A1 * | 8/2016 | ............. C08C 19/25 |
| WO | 2016/194316 A1 | 12/2016 | |
| WO | 2017/077712 A1 | 5/2017 | |
| WO | 2017/077714 A1 | 5/2017 | |
| WO | 2018/034217 A1 | 2/2018 | |
| WO | 2019/117218 A1 | 6/2019 | |

OTHER PUBLICATIONS

International Search Report for PCT/JP2019/039404 dated Dec. 24, 2019 [PCT/ISA/210].
Search Report dated Sep. 5, 2022 in Chinese Application No. 201980065395.4.
Extended European Search Report dated May 30, 2022 in European Application No. 19869569.4.
International Preliminary Report on Patentability dated Mar. 23, 2021 with a translation of the Written Opinion of the International Searching Authority in Application No. PCT/JP2019/039404.

* cited by examiner

*Primary Examiner* — Deve V Hall
(74) *Attorney, Agent, or Firm* — Sughrue Mion, PLLC

(57) ABSTRACT

To provide a rubber composition in which wet performance, wear resistance, low rolling resistance, and breaking resistance are highly balanced. A rubber composition comprising a rubber component comprising at least three polymers and a filler, wherein the rubber component is separated into at least two polymer phases: a polymer phase (1) with the highest tan δ peak temperature; and a polymer phase (2) with the lowest peak temperature; the polymer phases (1) and (2) are incompatible with each other; the polymer phase (1) at least comprises the modified conjugated diene-based polymers (A1) and (A2), and the filler; the modified conjugated diene-based polymer (A1) has a particular weight-average molecular weight and a particular contracting factor (g'); and when a filler concentration and an average aggregate area of the filler in the polymer phase (1) are defined as X and Y, respectively, an formula (1): Y<4.8X+1200 is satisfied.

20 Claims, No Drawings

RUBBER COMPOSITION, TREAD RUBBER, AND TIRE

CROSS REFERENCE TO RELATED APPLICATIONS

This application is a National Stage of International Application No. PCT/JP2019/039404 filed Oct. 4, 2019, claiming priority based on Japanese Patent Application No. 2018-189549 filed Oct. 4, 2018.

TECHNICAL FIELD

The present disclosure relates to a rubber composition, a tread rubber, and a tire.

BACKGROUND

Conventionally, inorganic fillers, such as silica, have been used to improve gripping performance on wet road surfaces (hereinafter, referred to as "wet performance"). However, such fillers also increase energy loss, making it difficult to reduce rolling resistance.

Furthermore, in addition to wear resistance against wear over time due to driving, tires are also required to have breaking resistance against chipping or other damage to the rubber of tires when driven on rough roads or the like.

For example, in order to provide a rubber composition for tire treads that is suited for use in the production of tires having an excellent balance between wet gripping performance and low rolling resistance performance without impairing the wear resistance of tires, Patent Literature 1 proposes a rubber composition for tire treads, wherein the rubber composition comprises, as a rubber component, at least two kinds of diene-based rubbers, where the tan δ temperature dispersion curve is bimodal and the tan δ peak temperature on the high temperature side is in the range of −10° C. to −50° C. and the tan δ peak temperature on the low temperature side is lower than the peak on the high temperature side by 10° C. or more; further comprises at least one kind of reinforcing filler at 30 to 90 parts by weight in total per 100 parts by weight of the rubber component; and, in the compound of the above, has a content of high Tg rubber component in the bound rubber thereof being [the compounding ratio of high Tg rubber component]×0.7 or less. However, in this case, it is not easy to achieve both low rolling resistance and wear resistance.

CITATION LIST

Patent Literature

PTL 1: Japanese Patent Laid-Open No. 8-27313

SUMMARY

Technical Problem

Therefore, an object of the present disclosure is to provide a rubber composition in which wet performance, wear resistance, low rolling resistance, and breaking resistance are highly balanced. Also, another object of the present disclosure is to provide a tread rubber and a tire in which wet performance, wear resistance, low rolling resistance, and breaking resistance are highly balanced.

Solution to Problem

A rubber composition according to the present disclosure is a rubber composition comprising a rubber component and a filler, wherein:
  the rubber component at least comprises a modified conjugated diene-based polymer (A1), a modified conjugated diene-based polymer (A2), and a third polymer;
  the modified conjugated diene-based polymer (A1) has a weight-average molecular weight of $20 \times 10^4$ to $300 \times 10^4$, includes a modified conjugated diene-based polymer with a molecular weight of $200 \times 10^4$ to $500 \times 10^4$ at 0.25 to 30% by mass relative to a total amount of the modified conjugated diene-based polymer (A1), and has a contracting factor (g') of less than 0.64;
  the rubber component is separated into at least two polymer phases: a polymer phase (1) with a peak temperature of a tan δ temperature dispersion curve being highest; and a polymer phase (2) with the peak temperature being lowest;
  the polymer phase (1) and the polymer phase (2) are incompatible with each other;
  the polymer phase (1) at least comprises the modified conjugated diene-based polymer (A1), the modified conjugated diene-based polymer (A2), and the filler; and
  when a concentration (%) of the filler in the polymer phase (1) is defined as X and an average aggregate area ($nm^2$) of the filler in the polymer phase (1) is defined as Y, X and Y satisfy the following formula (1):

$$Y < 4.8X + 1200 \qquad (1).$$

As a result, it is possible to highly balance the wet performance, wear resistance, low rolling resistance, and breaking resistance.

A tread rubber according to the present disclosure is a tread rubber using the rubber composition described above.

As a result, it is possible to highly balance the wet performance, wear resistance, low rolling resistance, and breaking resistance of the tread rubber.

A tire according to the present disclosure is a tire using the rubber composition described above.

As a result, it is possible to highly balance the wet performance, wear resistance, low rolling resistance, and breaking resistance of the tire.

Advantageous Effect

According to the present disclosure, it is possible to provide a rubber composition in which wet performance, wear resistance, low rolling resistance, and breaking resistance are highly balanced. According to the present disclosure, it is possible to provide a tread rubber and a tire in which wet performance, wear resistance, low rolling resistance, and breaking resistance are highly balanced.

DETAILED DESCRIPTION

Hereinafter, embodiments of the present disclosure will be described. The description for these embodiments is intended to illustrate the present disclosure and does not limit the present disclosure in any way.

In the following description, the modified conjugated diene-based polymer (A1) and the modified conjugated diene-based polymer (A2) may be denoted as the component (A1) and the component (A2), respectively.

In the present specification, numerical ranges are intended to include the lower limit value and the upper limit value of those ranges, unless otherwise noted. For example, 0.25 to 30% by mass means 0.25% by mass or more and 30% by mass or less.

(Rubber Composition)

The rubber composition according to the present disclosure comprises a rubber composition comprising a rubber component and a filler, wherein:
  the rubber component at least comprises a modified conjugated diene-based polymer (A1), a modified conjugated diene-based polymer (A2), and a third polymer, which are different from each other;
  the modified conjugated diene-based polymer (A1) has a weight-average molecular weight of $20 \times 10^4$ to $300 \times 10^4$, includes a modified conjugated diene-based polymer with a molecular weight of $200 \times 10^4$ to $500 \times 10^4$ at 0.25 to 30% by mass relative to the total amount of the modified conjugated diene-based polymer (A1), and has a contracting factor (g') of less than 0.64;
  the rubber component is separated into at least two polymer phases: a polymer phase (1) with the peak temperature of the tan δ temperature dispersion curve being highest; and a polymer phase (2) with the peak temperature being lowest;
  the polymer phase (1) and the polymer phase (2) are incompatible with each other;
  the polymer phase (1) at least comprises the modified conjugated diene-based polymer (A1), the modified conjugated diene-based polymer (A2), and the filler; and
  when the concentration (%) of the filler in the polymer phase (1) is defined as X and the average aggregate area (nm$^2$) of the filler in the polymer phase (1) is defined as Y, X and Y satisfy the following formula (1):

$$Y < 4.8X + 1200 \tag{1}$$

As a result, it is possible to highly balance the wet performance, wear resistance, low rolling resistance, and breaking resistance.

Polymer Phases

The rubber component is separated into at least two polymer phases: a polymer phase (1) with the peak temperature of the tan δ temperature dispersion curve being highest; and a polymer phase (2) with the peak temperature being lowest, and the polymer phase (1) and the polymer phase (2) are incompatible with each other. Furthermore, the polymer phase (1) at least comprises the modified conjugated diene-based polymer (A1), the modified conjugated diene-based polymer (A2), and the filler. In addition, when the concentration (%) of the filler in the polymer phase (1) is defined as X and the average aggregate area (nm$^2$) of the filler in the polymer phase (1) is defined as Y, X and Y satisfy the following formula (1):

$$Y < 4.8X + 1200 \tag{1}$$

That is, in the formula (1), when X and Y are described in the above units, Y is smaller than 4.8X+1200 on the right side. When this formula (1) is satisfied, more of the filler in the rubber composition is distributed in the polymer phase (1), and the filler is more highly dispersed in the polymer phase (1). Therefore, it is possible to highly balance the wet performance, wear resistance, low rolling resistance, and breaking resistance.

When the rubber component comprises only three kinds: the component (A1), the component (A2), and the third polymer, the polymer phase (1) comprises the component (A1), the component (A2), and the filler, as mentioned above, and the polymer phase (2) comprises the third polymer. In this case, the polymer phase (2) may or may not comprise the filler.

In the present disclosure, the tan δ temperature dispersion curve of the polymer phases was obtained by measurement using a viscoelastic spectrometer manufactured by Toyo Seiki Co., Ltd. under the conditions with a strain of 1% and a frequency of 52 Hz.

In the present disclosure, the existence of polymer phase (1) and polymer phase (2) and the fact that these polymer phases are incompatible are confirmed using FIB-SEM. Specifically, a 4 μm×4 μm area of the rubber composition is observed using FIB-SEM, and when there is a difference in the state of staining, it is defined that the polymer phase (1) and the polymer phase (2) are present and that these polymer phases are incompatible. In this case, they may be compatible by observation with naked eyes.

In the present disclosure, the concentration of the filler in the polymer phase (1) is determined by the following procedures 1 to 4.

Procedure 1: The amount (parts by mass) of polymers present in the polymer phase (1) is determined. For example, when the rubber component comprises three kinds: the component (A1), the component (A2), and the third polymer, the polymers present in the polymer phase (1) comprises only two kinds: the component (A1) and the component (A2). Accordingly, in this case, the total parts by mass of the component (A1) and the component (A2) compounded into the rubber composition is the amount (parts by mass) of the polymers present in the polymer phase (1).

Procedure 2: The proportion (distribution ratio) of the filler that is distributed (present) in the polymer phase (1) is determined. How to determine the distribution ratio of the filler will be mentioned later.

Procedure 3: The amount of filler included in the rubber composition is multiplied by the distribution ratio of the filler in the polymer phase (1). This value is the distribution amount (parts by mass) of the filler in the polymer phase (1).

Procedure 4: The distribution amount (parts by mass) of the filler determined in the procedure 3 is divided by the amount (parts by mass) of polymers present in the polymer phase (1) determined in the procedure 1, and then multiplied by 100. This value is the concentration (%) of the filler in the polymer phase (1).

In the above procedure 2, the distribution ratio (%) of the filler distributed in the polymer phase (1) is determined as the proportion of the area of the filler included in the polymer phase (1) relative to the total area of the filler included in all polymer phases of the rubber composition. Specifically, it is determined by the following procedures 2-1 to 2-4.

Procedure 2-1: A smooth face of the sample of rubber composition cut by the microtome is measured using AFM with a measurement range of 2 μm×2 μm. The resulting AFM image is converted into a multivalued image of each polymer phase and the filler (for example, a ternarized image in the case of polymer phases (1) and (2)) by histogram.

Procedure 2-2: Based on that multivalued image, the area of the filler included in each polymer phase is determined.

Procedure 2-3: The total of those filler areas is defined as the total area of the filler included in all polymer phases.

Procedure 2-4: The proportion (%) of the area of the filler included in the polymer phase (1) relative to the total area of the filler described above is defined as the distribution ratio (%) of the filler present in the polymer phase (1).

When the filler is on the boundary face between the polymer phases, the two points where the three, respective polymer phases and filler, are in contact are connected and the area of the filler is divided.

In the present disclosure, the average aggregate area of the filler in the polymer phase (1) is calculated by determining the aggregate area of the filler portion in the polymer phase (1) from an image obtained by FIB-SEM with a measurement range of 4 μm×4 μm, and then calculating the average aggregate area of the filler portion from the entire surface area of the filler portion and the number of aggregates as the number average (arithmetic average). In the calculation, particles in contact with the edges (sides) of the image are not counted, and particles with a size of 20 pixels or less are considered as noise and are not counted.

In the formula (1), X is not particularly limited as long as the formula (1) is satisfied, and for example, X is 30 or more, 50 or more, 100 or more, 150 or more, or 200 or more. Also, X is, for example, 350 or less, 300 or less, 250 or less, or 200 or less. The larger X is, the higher the concentration of the filler in the polymer phase (1) and the further improvement of wet performance. When X is less than 50, the effects of the present disclosure are small, and therefore, X is preferably 50 or more.

In the rubber composition according to the present disclosure, it is preferable that X in the above formula (1) should be larger than 100.

As a result, it is possible to achieve a further advanced balance between low rolling resistance and wet performance.

In the formula (1), Y is not particularly limited as long as the formula (1) is satisfied, and for example, Y is 2000 or less, 1950 or less, 1750 or less, or 1600 or less. Also, Y is, for example, 1000 or more, 1200 or more, 1300 or more, 1400 or more, 1500 or more, or 1600 or more. The smaller Y is, the smaller the average aggregate area of the filler in the polymer phase (1), the more highly dispersed the filler is in the polymer phase (1), and the further improvement in low rolling resistance.

<Rubber Component>

The rubber composition according to the present disclosure at least comprises, as the rubber component, the modified conjugated diene-based polymer (A1), the modified conjugated diene-based polymer (A2), and the third polymer, which are different from each other.

Both the component (A1) and the component (A2) are polymers obtained by modifying a conjugated diene-based polymer.

The conjugated diene-based polymer is a polymer of one kind of conjugated diene compound, or a copolymer of two or more kinds of conjugated diene compounds. Alternatively, the conjugated diene-based polymer may be a copolymer of a conjugated diene compound and an aromatic vinyl compound.

Examples of the conjugated diene compound include, for example, compounds having 4 to 12 carbon atoms, such as 1,3-butadiene, isoprene, 1,3-pentadiene, 2,3-dimethyl-1,3-butadiene, 2-phenyl-1,3-butadiene, 3-methyl-1,3-pentadiene, 1,3-hexadiene, and 1,3-heptadiene. As the conjugated diene compound, from the viewpoint of ease of industrial availability, 1,3-butadiene and isoprene are preferable.

Examples of the aromatic vinyl compound include, for example, styrene, p-methylstyrene, α-methylstyrene, vinylxylene, vinylnaphthalene, diphenylethylene, 1-vinylnaphthalene, 3-vinyltoluene, ethylvinylbenzene, divinylbenzene, 4-cyclohexylstyrene, and 2,4,6-trimethylstyrene. These aromatic vinyl compounds may be used singly as one kind, or may be used in combination of two or more kinds. As the aromatic vinyl compound, from the viewpoint of ease of industrial availability, styrene is preferable.

Examples of the conjugated diene-based polymer include, for example, a natural rubber (NR), a polybutadiene (BR), a synthetic polyisoprene (IR), a styrene butadiene copolymer (SBR), an isoprene butadiene copolymer, an ethylene butadiene copolymer, and a propylene butadiene copolymer.

Modified Conjugated Diene-Based Polymer (A1)

The modified conjugated diene-based polymer (A1) has a weight-average molecular weight of $20 \times 10^4$ to $300 \times 10^4$, includes a modified conjugated diene-based polymer with a molecular weight of $200 \times 10^4$ to $500 \times 10^4$ at 0.25 to 30% by mass relative to the total amount of the modified conjugated diene-based polymer (A1), and has a contracting factor (g') of less than 0.64.

The weight-average molecular weight (Mw) of the component (A1) is $20 \times 10^4$ to $300 \times 10^4$. The above Mw is preferably $50 \times 10^4$ or more, $64 \times 10^4$ or more, or $80 \times 10^4$ or more. Also, the above Mw is preferably $250 \times 10^4$ or less, $180 \times 10^4$ or less, or $150 \times 10^4$ or less. When the Mw is $20 \times 10^4$ or more, it is possible to highly achieve both low rolling resistance and wet performance of the tire. In addition, when the Mw is $300 \times 10^4$ or less, the processability of the rubber composition is improved.

For the conjugated diene-based polymer and the component (A1), the number-average molecular weight, the weight-average molecular weight, the molecular weight distribution, and the content of a particular high molecular weight component, which will be mentioned later, are measured as follows. Using the conjugated diene-based polymer or modified conjugated diene-based polymer as the sample, the chromatogram was measured using a GPC (gel permeation chromatography) measurement apparatus (trade name "HLC-8320GPC" manufactured by Tosoh Corporation) equipped with three connected columns packed with a polystyrene-based gel and an RI detector (trade name "HLC-8020" manufactured by Tosoh Corporation). Based on the calibration curve obtained by using the standard polystyrene, determined are the weight-average molecular weight (Mw), the number-average molecular weight (Mn), the molecular weight distribution (Mw/Mn), the peak top molecular weight ($Mp_1$) of the modified conjugated diene-based polymer, the peak top molecular weight ($Mp_2$) of the conjugated diene-based polymer, the ratio between them ($Mp_1/Mp_2$), and the proportion of a modified conjugated diene-based polymer with a molecular weight of $200 \times 10^4$ to $500 \times 10^4$. As the elute, 5 mmol/L of triethylamine in THF (tetrahydrofuran) is used. As the columns, three of "TSKgel SuperMultiporeHZ-H" (trade name) manufactured by Tosoh Corporation are connected, and to the preceding stage thereof, "TSKguardcolumn SuperMP(HZ)-H" (trade name) manufactured by Tosoh Corporation is connected as a guard column and used. Ten milligrams of the sample for measurement is dissolved in 10 mL of THF to make the measurement solution, and 10 μL of the measurement solution is injected into the GPC measurement apparatus and measured under the conditions with an oven temperature of 40° C. and a THF flow rate of 0.35 mL/min.

The peak top molecular weights ($Mp_1$ and $Mp_2$) are determined as described below. In the GPC curve obtained from the measurement, a peak that is detected as the component with the highest molecular weight is selected. For the selected peak, a molecular weight corresponding to the maximum value of that peak is calculated and defined as the peak top molecular weight.

The modified conjugated diene-based polymer (A1) includes a modified conjugated diene-based polymer with a molecular weight of $200\times10^4$ to $500\times10^4$ (in the present specification, this may also be referred to as the "particular high molecular weight component") at 0.25 to 30% by mass relative to the total amount (100% by mass) of the modified conjugated diene-based polymer (A1). When the content of the particular high molecular weight component is within this range, it is possible to highly achieve both low rolling resistance and wet performance of the tire.

Also, the proportion of the modified conjugated diene-based polymer with a molecular weight of $200\times10^4$ to $500\times10^4$ is calculated by, in the entire integral molecular weight distribution curve, subtracting the proportion occupied by a molecular weight of less than $200\times10^4$ from the proportion occupied by a molecular weight of $500\times10^4$ or less.

In one example, the component (A1) includes the particular high molecular weight component at 1.0% by mass or more, 1.4% by mass or more, 1.75% by mass or more, 2.0% by mass or more, 2.15% by mass or more, or 2.5% by mass or more. In one example, the component (A1) includes the particular high molecular weight component at 28% by mass or less, 25% by mass or less, 20% by mass or less, or 18% by mass or less.

In the present specification, the "molecular weight" refers to a molecular weight in terms of standard polystyrene, obtained by GPC. In order to obtain the component (A1) in which the content of the particular high molecular weight component is within such a range, it is preferable to control the reaction conditions in the polymerization step and the reaction step, which will be mentioned later. For example, in the polymerization step, the amount of an organic monolithium compound to be used as the polymerization initiator, which will be mentioned later, may be adjusted. Also, in the polymerization step, a method with a residence time distribution may be used in both continuous and batch polymerization modes, that is, the time distribution of the growth reaction may be broadened.

In one example, the molecular weight distribution (Mw/Mn) of the component (A1) is 1.6 to 3.0.

The contracting factor (g') of the modified conjugated diene-based polymer (A1) is less than 0.64. In general, a polymer with branches tends to have a smaller molecular size when compared to a linear polymer with the same absolute molecular weight, and the above contracting factor (g') is an indicator of the ratio of the size occupied by the molecule when compared to an assumed linear polymer with the same absolute molecular weight. That is, as the degree of branching of the polymer is increased, the contracting factor (g') tends to become smaller. In the present embodiment, the intrinsic viscosity is used as an indicator of the size of the molecule, assuming that the linear polymer follows the following relational formula: intrinsic viscosity $[\eta]= -3.883\ M^{0.771}$. The contracting factor (g') of the modified conjugated diene-based polymer for each absolute molecular weight is calculated, and the average value of the contracting factor (g') when the absolute molecular weight is $100\times10^4$ to $200\times10^4$ is defined as the contracting factor (g') of that modified conjugated diene-based polymer. Here, "branches" are formed by, to one polymer, the direct or indirect bonding of other polymers. In addition, the "degree of branching" refers to the number of polymers that are directly or indirectly bonded to each other for one branch. For example, when five conjugated diene-based polymer chains, which will be mentioned later, are indirectly bonded to each other via a coupling residual group, which will be mentioned later, the degree of branching is 5. Note that the coupling residual group is a constituent unit of the modified conjugated diene-based polymer that is bonded to the conjugated diene-based polymer chain, and is, for example, a structural unit derived from a coupling agent that is generated by a reaction between the conjugated diene-based polymer and the coupling agent, which will be mentioned later. Also, the conjugated diene-based polymer chain is a constituent unit of the modified conjugated diene-based polymer, and is, for example, a structural unit derived from the conjugated diene-based polymer that is generated by a reaction between the conjugated diene-based polymer and a coupling agent, which will be mentioned later.

The contracting factor (g') is, for example, 0.63 or less, 0.60 or less, 0.59 or less, or 0.57 or less. Also, the lower limit of the contracting factor (g') is not limited and may be at or below the detection limit value. For example, it is 0.30 or more, 0.33 or more, 0.35 or more, 0.45 or more, 0.57 or more, or 0.59 or more. By using the component (A1) in which the contracting factor (g') is within this range, the processability of the rubber composition is improved.

Since the contracting factor (g') tends to depend on the degree of branching, for example, the degree of branching can be used as an indicator to control the contracting factor (g'). Specifically, when the modified conjugated diene-based polymer has a degree of branching of 6, its contracting factor (g') tends to be 0.59 to 0.63, and when the modified conjugated diene-based polymer has a degree of branching of 8, its contracting factor (g') tends to be 0.45 to 0.59.

The method for measuring the contracting factor (g') is as follows. The modified conjugated diene-based polymer is used as the sample and measured using a GPC measurement apparatus (trade name "GPCmax VE-2001" manufactured by Malvern Panalytical Ltd.) equipped with three connected columns packed with a polystyrene-based gel, and using three detectors connected in the order of light scattering detector, RI detector, and viscosity detector (trade name "TDA305" manufactured by Malvern Panalytical Ltd.). Based on the standard polystyrene, the absolute molecular weight is determined from the results of the light scattering detector and the RI detector, and the intrinsic viscosity is determined from the results of the RI detector and the viscosity detector. The linear polymer is used assuming that it follows the following formula: intrinsic viscosity $[\eta]= -3.883\ M^{0.771}$, and the contracting factor (g') is calculated as the ratio of the intrinsic viscosities corresponding to the respective molecular weights. As the elute, 5 mmol/L of triethylamine in THF is used. As the columns, "TSKgel G4000HXL", "TSKgel G5000HXL", and "TSKgel G6000HXL" (all trade names) manufactured by Tosoh Corporation are connected and used. Twenty milligrams of the sample for measurement is dissolved in 10 mL of THF to make the measurement solution, and 100 μL of the measurement solution is injected into the GPC measurement apparatus and measured under the conditions with an oven temperature of 40° C. and a THF flow rate of 1 mL/min.

The amount of an extender oil to be added to the component (A1) may be regulated as appropriate, and it is, for example, 1 to 40 parts by mass, 1 to 35 parts by mass, or 1 to 10 parts by mass relative to 100 parts by mass of the component (A1). In another example, the amount of the extender oil to be added to the component (A1) is more than 0 parts by mass and 10 parts by mass or less relative to 100 parts by mass of the component (A1).

Examples of the extender oil include, for example, an aroma oil, a naphthenic oil, a paraffin oil, and an aroma substitute oil. Among the above, from the viewpoint of environmental safety as well as prevention of oil bleeding and wet braking performance, an aroma substitute oil with a polycyclic aromatic (PCA) component of 3% by mass or less according to the IP346 method is preferable. Examples of the aroma substitute oil include, in addition to the TDAEs (Treated Distillate Aromatic Extracts), MESs (Mild Extraction Solvates), described in Kautschuk Gummi Kunststoffe, 52 (12), 799 (1999), and RAEs (Residual Aromatic Extracts).

The component (A1) can be an oil-extended polymer with an extender oil added, and may be either non-oil-extended or oil-extended.

It is preferable that the component (A1) should have branches and a degree of branching of 5 or more. In addition, it is more preferable that the component (A1) should have one or more coupling residual groups and conjugated diene-based polymer chains bonded to such coupling residual groups, and further that the above branches should include branches in which five or more such conjugated diene-based polymer chains are bonded to one such coupling residual group. By specifying the structure of the modified conjugated diene-based polymer such that the degree of branching is 5 or more and the branches include branches in which five or more conjugated diene-based polymer chains are bonded to one coupling residual group, the contracting factor (g') can be made to be less than 0.64 more reliably. Note that the number of conjugated diene-based polymer chains bonded to one coupling residual group can be confirmed from the value of the contracting factor (g').

Moreover, it is more preferable that the component (A1) should have branches and a degree of branching of 6 or more. In addition, it is still more preferable that the component (A1) should have one or more coupling residual groups and conjugated diene-based polymer chains bonded to such coupling residual groups, and further that the above branches should include branches in which six or more such conjugated diene-based polymer chains are bonded to one such coupling residual group. By specifying the structure of the modified conjugated diene-based polymer such that the degree of branching is 6 or more and the branches include branches in which six or more conjugated diene-based polymer chains are bonded to one coupling residual group, the contracting factor (g') can be made to be 0.63 or less.

Furthermore, it is still more preferable that the component (A1) should have branches and a degree of branching of 7 or more, and it is even more preferable that the degree of branching should be 8 or more. Although the upper limit of the degree of branching is not particularly limited, it is preferably 18 or less. In addition, it is even more preferable that the component (A1) should have one or more coupling residual groups and conjugated diene-based polymer chains bonded to such coupling residual groups, and further that the above branches should include branches in which seven or more such conjugated diene-based polymer chains are bonded to one such coupling residual group, and it is particularly preferable that the above branches should include branches in which eight or more such conjugated diene-based polymer chains are bonded to one such coupling residual group. By specifying the structure of the modified conjugated diene-based polymer such that the degree of branching is 8 or more and the branches include branches in which eight or more conjugated diene-based polymer chains are bonded to one coupling residual group, the contracting factor (g') can be made to be 0.59 or less.

It is preferable that the modified conjugated diene-based polymer (A1) should be represented by the following general formula (I):

[Formula 1]

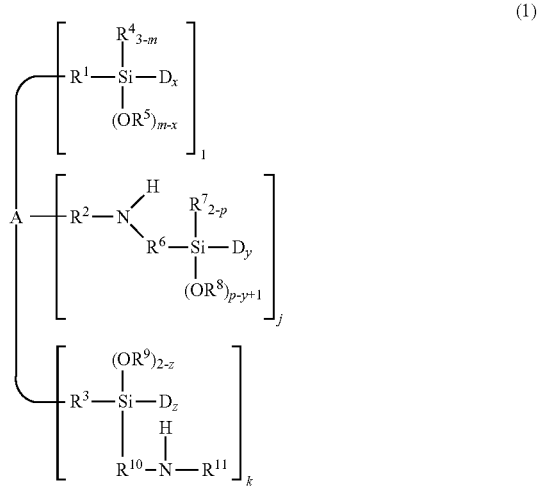

[In the general formula (I), D represents a conjugated diene-based polymer chain; $R^1$, $R^2$, and $R^3$ each independently represent a single bond or an alkylene group having 1 to 20 carbon atoms; $R^4$ and $R^7$ each independently represent an alkyl group having 1 to 20 carbon atoms; $R^5$, $R^8$, and $R^9$ each independently represent a hydrogen atom or an alkyl group having 1 to 20 carbon atoms; $R^6$ and $R^{10}$ each independently represent an alkylene group having 1 to 20 carbon atoms; $R^{11}$ represents a hydrogen atom or an alkyl group having 1 to 20 carbon atoms; m and x each independently represent an integer of 1 to 3, and x m; p represents 1 or 2, y represents an integer of 1 to 3, and y≤(p+1); z represents 1 or 2; when each of D, $R^1$ to $R^{11}$, m, p, x, y, and z is present in plural, they are independent of each other; i represents an integer of 0 to 6, j represents an integer of 0 to 6, k represents an integer of 0 to 6, and (i+j+k) is an integer of 3 to 10; ((x×i)+(y×j)+(z×k)) is an integer of 5 to 30; and A represents a hydrocarbon group having 1 to 20 carbon atoms or an organic group having at least one kind of atom selected from the group consisting of an oxygen atom, a nitrogen atom, a silicon atom, a sulfur atom, and a phosphorus atom and having no active hydrogen.].

As a result, it is possible to more highly balance the wet performance, wear resistance, low rolling resistance, and breaking resistance.

In one example, in the general formula (I), the weight-average molecular weight of the conjugated diene-based polymer chain represented by D is $10×10^4$ to $100×10^4$. The conjugated diene-based polymer chain is a constituent unit of the modified conjugated diene-based polymer, and is, for example, a structural unit derived from the conjugated diene-based polymer that is generated by a reaction between the conjugated diene-based polymer and a coupling agent.

In the general formula (I), the hydrocarbon group represented by A encompasses saturated, unsaturated, aliphatic, and aromatic hydrocarbon groups. Examples of the above organic group having no active hydrogen include, for example, organic groups having no functional group having active hydrogen, such as a hydroxyl group (—OH), a secondary amino group (>NH), a primary amino group (—NH$_2$), and a sulfhydryl group (—SH).

In the general formula (I), it is preferable that A should be represented by any of the following general formulas (II) to (V):

[Formula 2]

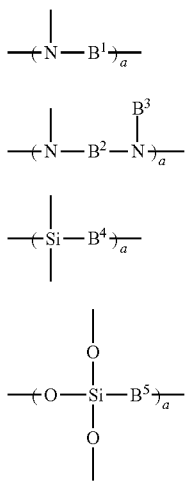

(II)
(III)
(IV)
(V)

[In the general formula (II), $B^1$ represents a single bond or a hydrocarbon group having 1 to 20 carbon atoms; a represents an integer of 1 to 10; and when $B^1$ is present in plural, they are independent of each other;
in the general formula (III), $B^2$ represents a single bond or a hydrocarbon group having 1 to 20 carbon atoms; $B^3$ represents an alkyl group having 1 to 20 carbon atoms; a represents an integer of 1 to 10; and when each of $B^2$ and $B^3$ is present in plural, they are independent of each other;
in the general formula (IV), $B^4$ represents a single bond or a hydrocarbon group having 1 to 20 carbon atoms; a represents an integer of 1 to 10; and when $B^4$ is present in plural, they are independent of each other; and
in the general formula (V), $B^5$ represents a single bond or a hydrocarbon group having 1 to 20 carbon atoms; a represents an integer of 1 to 10; and when $B^5$ is present in plural, they are independent of each other.].

As a result, it is possible to more highly balance the wet performance, wear resistance, low rolling resistance, and breaking resistance.

In one example, in the above general formula (I), A is represented by the above general formula (II) or (III), and k represents 0. In another example, in the above general formula (I), A is represented by the above general formula (II) or (III), k represents 0, and in the above general formula (II) or (III), a represents an integer of 2 to 10. In yet another example, in the above general formula (I), A is represented by the above general formula (II), k represents 0, and in the above general formula (II), a represents an integer of 2 to 10.

For $B^1$, $B^2$, $B^4$, and $B^5$ in the general formulas (II) to (V), examples of the hydrocarbon group having 1 to 20 carbon atoms include alkylene groups having 1 to 20 carbon atoms.

It is preferable that the component (A1) should have a nitrogen atom and a silicon atom. In this case, the processability of the rubber composition becomes good, and when applied to a tire, the low rolling resistance can be further improved while improving the wet braking performance and wear resistance of the tire. Note that, as for whether the component (A1) has a nitrogen atom, it is determined that the component (A1) has a nitrogen atom when the calculated modification rate is 10% or more by the measurement method of the modification rate, which will be mentioned later.

Whether the component (A1) has a silicon atom is determined by the following method. Zero point five grams of the modified conjugated diene-based polymer is used as the sample and measured using an ultraviolet and visible spectrophotometer (trade name "UV-1800" manufactured by Shimadzu Corporation) in accordance with JIS K 0101 44.3.1, quantifying the silicon atom by the molybdenum blue absorption spectrophotometry. As a result, when the silicon atom is detected (lower detection limit: 10 ppm by mass), it is determined that the sample has a silicon atom.

In one example, at least one terminal of each conjugated diene-based polymer chain is bonded to the silicon atom that the coupling residual group has. In this case, the terminals of multiple conjugated diene-based polymer chains may be bonded to one silicon atom. In addition, the terminal of the conjugated diene-based polymer chain and an alkoxy group having 1 to 20 carbon atoms or a hydroxyl group may be bonded to one silicon atom, resulting in that one silicon atom constituting an alkoxy silyl group having 1 to 20 carbon atoms or a silanol group.

The bound conjugated diene content in the conjugated diene-based polymer or the component (A1) is, for example, 40 to 100% by mass, or 55 to 80% by mass. When the bound conjugated diene content is within the above range, it is possible to more highly balance the wet performance, wear resistance, low rolling resistance, and breaking resistance upon applying the rubber composition to a tire.

Also, the bound aromatic vinyl content in the conjugated diene-based polymer or the component (A1) is, for example, 0% by mass or more, 20% by mass or more, or 35% by mass or more. In addition, the bound aromatic vinyl content in the conjugated diene-based polymer or the component (A1) is, for example, 60% by mass or less, or 45% by mass or less. When the bound aromatic vinyl content is within the above range, it is possible to more highly balance the wet performance, wear resistance, low rolling resistance, and breaking resistance upon applying the rubber composition to a tire.

The bound aromatic vinyl content can be measured by ultraviolet absorption of a phenyl group, and based on this, the bound conjugated diene content can also be determined. Specifically, the measurement is carried out in accordance with the following method. The modified conjugated diene-based polymer is used as the sample, and 100 mg of the sample is diluted to 100 mL with and dissolved in chloroform, preparing a measurement sample. Based on the amount of absorption at the ultraviolet absorption wavelength (around 254 nm) by the phenyl group of styrene, the bound styrene content (% by mass) relative to 100% by mass of the sample is measured (a spectrophotometer "UV-2450" manufactured by Shimadzu Corporation).

In the conjugated diene-based polymer or the component (A1), the vinyl bond content in the conjugated diene bonding unit is, for example, 10 to 75% by mol, or 20 to 65% by mol.

When the component (A1) is a copolymer of butadiene and styrene, the vinyl bond content (1,2-bond content) in the butadiene bonding unit can be determined by the Hampton's method [R. R. Hampton, Analytical Chemistry, 21, 923 (1949)]. Specifically, the method is as follows. The modified conjugated diene-based polymer is used as the sample, and 50 mg of the sample is dissolved in 10 mL of carbon disulfide, preparing a measurement sample. Using a solution cell, the infrared spectrum is measured in the range of 600 to 1000 $cm^{-1}$, and based on the absorbance at a given wavenumber, the microstructure of the butadiene moiety, that is, the 1,2-vinyl bond content (mol %), is determined according to the calculation formula of the above Hampton's method (a Fourier transform infrared spectroscopy "FT-IR230" manufactured by JASCO Corporation).

It is preferable for the component (A1) to have a Tg higher than −50° C., and still more preferable to have a Tg of −45 to −15° C. When the component (A1) has a Tg in the range of −45 to −15° C., it is possible to further highly achieve the wet performance, wear resistance, low rolling resistance, and breaking resistance upon applying the rubber composition to a tire.

For the Tg, the DSC curve is recorded while the temperature is raised in a given temperature range according to ISO 22768:2006, and the peak top (inflection point) of the DSC differential curve is defined as the Tg. Specifically, it is as follows. The modified conjugated diene-based polymer is used as the sample, and the DSC curve is recorded using a differential scanning calorimeter "DSC3200S" manufactured by MAC Science Ltd. in accordance with ISO 22768:2006, while the temperature is raised from −100° C. at 20° C./min under the circulation of helium at 50 mL/min, and the peak top (inflection point) of the DSC differential curve is defined as the Tg.

In the rubber composition according to the present disclosure, it is preferable that the difference between glass transition temperatures (Tg) of the modified conjugated diene-based polymer (A1) and the modified conjugated diene-based polymer (A2) should be 20° C. or more.

As a result, it is possible to further improve the wear resistance.

In one example, the difference in Tg between the component (A1) and the component (A2) is 20 to 40° C.

The component (A1) has a Mooney viscosity measured at 100° C. of, for example, 20 to 100 or 30 to 80.

The method for measuring the Mooney viscosity is as follows. Using the conjugated diene-based polymer or modified conjugated diene-based polymer as the sample, the Mooney viscosity is measured in accordance with JIS K6300, using a Mooney viscometer (trade name "VR1132" manufactured by Ueshima Seisakusho Co., Ltd.) with an L-shaped rotor. The measurement temperature is 110° C. when the conjugated diene-based polymer is used as the sample, and 100° C. when the modified conjugated diene-based polymer is used as the sample. At first, the sample is preheated at the test temperature for 1 minute, then the rotor is rotated at 2 rpm, and the torque after 4 minutes is measured and defined as the Mooney viscosity (ML(i+4)).

In one embodiment, the component (A1) is a modified styrene butadiene rubber.

In the rubber composition according to the present disclosure, it is preferable that the modified conjugated diene-based polymer (A1) and the modified conjugated diene-based polymer (A2) should each be a modified styrene butadiene rubber.

As a result, it is possible to achieve a further advanced balance between low rolling resistance and wet performance.

Synthetic Method of Modified Conjugated Diene-Based Polymer (A1)

The synthetic method of the component (A1) is not particularly limited, and for example, mention may be made of a synthetic method having: a polymerization step in which an organic monolithium compound is used as a polymerization initiator and at least a conjugated diene compound is polymerized to obtain a conjugated diene-based polymer; and a reaction step in which a pentafunctional or higher reactive compound (hereinafter, this may also be referred to as the "coupling agent") is allowed to react with an active terminal of the conjugated diene-based polymer.

Examples of the polymerization step include, for example, polymerization by growth reaction with living anionic polymerization reaction. As a result, a conjugated diene-based polymer having an active terminal can be obtained, and a component (A1) with a high modification rate can be obtained.

The amount of organic monolithium compound to be used as the polymerization initiator can be adjusted depending on the target molecular weight of the conjugated diene-based polymer or modified conjugated diene-based polymer. When the amount of polymerization initiator is reduced, the molecular weight is increased; on the other hand, when the amount of polymerization initiator is increased, the molecular weight is decreased.

The organic monolithium compound is preferably an alkyllithium compound from the viewpoint of ease of industrial availability and ease of controlling the polymerization reaction. In this case, a conjugated diene-based polymer having an alkyl group at the polymerization initiation terminal is obtained.

Examples of the alkyllithium compound include, for example, n-butyllithium, sec-butyllithium, tert-butyllithium, n-hexyllithium, benzyllithium, phenyllithium, and stilbenelithium. These organic monolithium compounds may be used singly as one kind, or may be used in combination of two or more kinds.

In the polymerization step, the polymerization reaction mode of batch type or continuous type can be selected and used as appropriate.

In the polymerization step, an inert solvent may be used.

Examples of the inert solvent include, for example, aliphatic hydrocarbons, such as butane, pentane, hexane, and heptane; alicyclic hydrocarbons, such as cyclopentane, cyclohexane, methylcyclopentane, and methylcyclohexane; aromatic hydrocarbons, such as benzene, toluene, and xylene. These inert solvents may be used singly as one kind, or may be used in combination of two or more kinds.

Before using an inert solvent for the polymerization reaction, it may be treated with an organometallic compound in order to remove impurities in the inert solvent, such as allenes and acetylenes.

In the polymerization step, a polar compound may be used. By using a polar compound, the aromatic vinyl compound can be randomly copolymerized with the conjugated diene compound. In addition, the polar compound can also be used as a vinylizing agent for controlling the microstructure of the conjugated diene part.

Examples of the polar compound include, for example, ethers, such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds, such as tetramethylethylenediamine, dipiperidinoethane, trimethylamine, triethylamine, pyridine, and quinuclidine; alkali metal alkoxide compounds, such as potassium tert-amylate, potassium tert-butyrate, sodium tert-butyrate, and sodium amylate; phosphine compounds, such as triphenylphosphine. These polar compounds may be used singly as one kind, or may be used in combination of two or more kinds.

The polymerization temperature in the polymerization step may be regulated as appropriate, and for example, from the viewpoint of ensuring a sufficient reaction amount of coupling agent for the active terminal after the end of polymerization, it is 0 to 120° C. or 50 to 100° C.

Examples of the coupling agent include, for example, a pentafunctional or higher reactive compound having a nitrogen atom and a silicon atom. It is preferable that the reactive compound should have at least three silicon-containing functional groups. The coupling agent is preferably one in which at least one silicon atom constitutes an alkoxy silyl group having 1 to 20 carbon atoms or a silanol group, and more preferably a compound represented by the general formula (VI), which will be mentioned later. These coupling agents may be used singly as one kind, or may be used in combination of two or more kinds.

The alkoxy silyl group that the coupling agent has, for example, tends to react with the active terminal that the conjugated diene-based polymer has, dissociating the alkoxy lithium and forming a bond between the terminal of the conjugated diene-based polymer chain and the silicon of the coupling residual group. The number of alkoxy silyl groups that the coupling residual group has is obtained by subtracting the number of SiOR decreased by the reaction from the total number of SiOR that one molecule of coupling agent has. Also, the azasilacycle group that the coupling agent has forms a >N—Li bond and a bond between the terminal of the conjugated diene-based polymer and the silicon of the coupling residual group. Note that the >N—Li bond tends to easily become >NH and LiOH by water or the like during finishing. Also, in the coupling agent, the remaining unreacted alkoxy silyl group may easily become silanol (Si—OH group) by water or the like during finishing.

It is preferable that the modified conjugated diene-based polymer (A1) should be prepared by allowing a conjugated diene-based polymer to react with a coupling agent represented by the following general formula (VI):

[Formula 3]

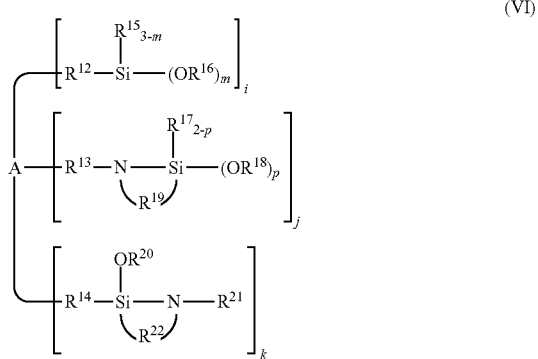

(VI)

[In the general formula (VI), $R^{12}$, $R^{13}$, and $R^{14}$ each independently represent a single bond or an alkylene group having 1 to 20 carbon atoms; $R^{15}$, $R^{16}$, $R^{17}$, $R^{18}$, and $R^{20}$ each independently represent an alkyl group having 1 to 20 carbon atoms; $R^{19}$ and $R^{22}$ each independently represent an alkylene group having 1 to 20 carbon atoms; $R^{21}$ represents an alkyl group or trialkyl silyl group having 1 to 20 carbon atoms; m represents an integer of 1 to 3; p represents 1 or 2; when $R^{12}$ to $R^{22}$, m, and p are present in plural, they are independent of each other; i, j, and k each independently represent an integer of 0 to 6, provided that (i+j+k) is an integer of 3 to 10; and A represents a hydrocarbon group having 1 to 20 carbon atoms or an organic group having at least one kind of atom selected from the group consisting of an oxygen atom, a nitrogen atom, a silicon atom, a sulfur atom, and a phosphorus atom and having no active hydrogen.].

As a result, it is possible to more highly balance the wet performance, wear resistance, low rolling resistance, and breaking resistance.

In the general formula (VI), the hydrocarbon group represented by A encompasses saturated, unsaturated, aliphatic, and aromatic hydrocarbon groups. Examples of the organic group having no active hydrogen include, for example, organic groups having no functional group having active hydrogen, such as a hydroxyl group (—OH), a secondary amino group (>NH), a primary amino group (—NH$_2$), and a sulfhydryl group (—SH).

In one example, in the above general formula (VI), A is represented by the above general formula (II) or (III), and k represents 0. In another example, in the above general formula (VI), A is represented by the above general formula (II) or (III), k represents 0, and in the above general formula (II) or (III), a represents an integer of 2 to 10. In yet another example, in the above general formula (VI), A is represented by the above general formula (II), k represents 0, and in the above general formula (II), a represents an integer of 2 to 10.

Examples of such a coupling agent include, for example, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, bis(3-trimethoxysilylpropyl)-[3-(2,2-dimethoxy-1-aza-2-silacyclopentane)propyl]amine, tris(3-trimethoxysilylpropyl)amine, tris(3-triethoxysilylpropyl)amine, tris(3-trimethoxysilylpropyl)-[3-(2,2-dimethoxy-1-aza-2-silacyclopentane)propyl]-1,3-propanediamine, tris(3-trimethoxysilylpropyl)-methyl-1,3-propanediamine, and bis[3-(2,2-dimethoxy-1-aza-2-silacyclopentane)propyl]-(3-trismethoxysilylpropyl)-methyl-1,3-propanediamine.

The amount of the compound represented by the general formula (VI) to be added as a coupling agent can be adjusted such that the number of moles of conjugated diene-based polymer versus the number of moles of coupling agent react in the desired stoichiometric ratio, which thus tends to achieve the desired degree of branching. The number of moles of polymerization initiator is specifically, for example, 5.0 times or more or 6.0 times or more than the number of moles of coupling agent. In this case, in the general formula (VI), the number of functional groups of the coupling agent ((m−1)×i+p×j+k) is an integer of 5 to 10, or an integer of 6 to 10.

The reaction temperature in the reaction step may be regulated as appropriate, and for example, it is 0 to 120° C. or 50 to 100° C. In addition, the temperature change from the end of the polymerization step until the addition of the coupling agent is, for example, 10° C. or less or 5° C. or less.

The reaction time in the reaction step may be regulated as appropriate, and for example, it is 10 seconds or more or 30 seconds or more. It is preferable that the time from the end of the polymerization step until the start of the reaction step should be shorter, and for example, it is 5 minutes or shorter from the viewpoint of coupling rate.

Mixing in the reaction step may be carried out either by mechanical stirring or stirring with a static mixer or the like.

In order to obtain the component (A1) having the particular high molecular weight component described above, the molecular weight distribution (Mw/Mn) of the conjugated diene-based polymer may be 1.5 to 2.5 or 1.8 to 2.2.

In addition, it is preferable that the resulting component (A1) should have a molecular weight curve by GPC in which a single peak is detected.

In one example, when the peak molecular weight by GPC of the component (A1) is defined as $Mp_1$ and the peak molecular weight of the conjugated diene-based polymer is defined as $Mp_2$, the following formula holds.

$$(Mp_1/Mp_2)<1.8\times 10-12\times (Mp_2-120\times 10^4)^2+2$$

In one example, $Mp_2$ is $20\times 10^4$ to $80\times 10^4$, and $Mp_1$ is $30\times 10^4$ to $150\times 10^4$.

The modification rate of the component (A1) is, for example, 30% by mass or more, 50% by mass or more, or 70% by mass or more. When the modification rate is 30% by mass or more, upon applying the rubber composition to a tire, the low rolling resistance can be further improved while improving the wear resistance of the tire.

The method for measuring the modification rate is as follows. Using the modified conjugated diene-based polymer as the sample, the measurement is carried out by applying the characteristics that the modified basic polymer component is adsorbed on a GPC column packed with a silica-based gel. The amount of adsorption on a silica-based column is measured from the difference between the chromatogram obtained by measuring a sample solution containing the sample and a low molecular weight internal standard polystyrene on a polystyrene-based column and the chromatogram obtained by measuring the sample solution on a silica-based column, thereby determining the modification rate. Specifically, the measurement is carried out as follows.

Preparation of sample solution: Ten milligrams of the sample and 5 mg of the standard polystyrene are dissolved in 20 mL of THF to make the sample solution.

GPC measurement conditions using polystyrene-based columns: Using "HLC-8320GPC" (trade name) manufactured by Tosoh Corporation and using 5 mmol/L of triethylamine in THF as the elute, 10 μL of the sample solution is injected into the apparatus under the conditions with a column oven temperature of 40° C. and a THF flow rate of 0.35 mL/min, and the chromatogram is obtained using an RI detector. As the columns, three of "TSKgel SuperMultiporeHZ-H" (trade name) manufactured by Tosoh Corporation are connected, and to the preceding stage thereof, "TSKguardcolumn SuperMP(HZ)-H" (trade name) manufactured by Tosoh Corporation is connected as a guard column and used.

GPC measurement conditions using silica-based columns: Using "HLC-8320GPC" (trade name) manufactured by Tosoh Corporation and using THF as the elute, 50 μL of the sample solution is injected into the apparatus under the conditions with a column oven temperature of 40° C. and a THF flow rate of 0.5 mL/min, and the chromatogram is obtained using an RI detector. As the columns, "Zorbax PSM-1000S", "PSM-300S", and "PSM-60S" (all trade names) are connected and used, and to the preceding stage thereof, "DIOL 4.6×12.5 mm 5 micron" (trade name) is connected as a guard column and used.

Method for calculating modification rate: The modification rate (%) is determined according to the following formula, where the entire peak area of the chromatogram using the polystyrene-based columns is defined as 100, the peak area of the sample is defined as P1, the peak area of the standard polystyrene is defined as P2, the entire peak area of the chromatogram using the silica-based columns is defined as 100, the peak area of the sample is defined as P3, and the peak area of the standard polystyrene is defined as P4.

Modification rate $(\%)=[1-(P2\times P3)/(P1\times P4)]\times 100$ (Note that P1+P2=P3+P4=100.)

After the reaction step, a quencher, neutralizing agent, or the like may be added to the copolymer solution, if necessary. Examples of the quencher include, for example, water and alcohols, such as methanol, ethanol, and isopropanol. Examples of the neutralizing agent include, for example, carboxylic acids, such as stearic acid, oleic acid, and versatic acid (a mixture of highly branched carboxylic acids having 9 to 11, mainly 10 carbon atoms); aqueous solutions of inorganic acids; and carbon dioxide.

From the viewpoint of preventing gel formation after polymerization and of improving stability during processing, it is preferable to add an antioxidant to the component (A1), such as 2,6-di-tert-butyl-4-hydroxytoluene (BHT), n-octadecyl-3-(4'-hydroxy-3',5'-di-tert-butylphenol) propionate, and 2-methyl-4,6-bis[(octylthio)methyl]phenol.

In order to further improve the processability of the component (A1), an extender oil may be added to the modified conjugated diene-based copolymer, if necessary. As the method for adding the extender oil to the modified conjugated diene-based polymer, mention may be made of, for example, a method in which the extender oil is added to the polymer solution and mixed to form an oil-extended copolymer solution, which is then desolvated.

As the method for acquiring the component (A1) from the polymer solution, publicly known methods can be used. Examples of such methods include a method in which, after separating the solvent by steam stripping or the like, the polymer is filtered out and further dehydrated and dried to obtain the polymer; a method in which the polymer solution is concentrated in a flushing tank and further devolatilized with a vent extruder or the like; a method in which the polymer solution is directly devolatilized with a drum dryer or the like.

The amount of the component (A1) in the rubber component may be regulated as appropriate, and for example, it is 10 parts by mass or more, 20 parts by mass or more, 30 parts by mass or more, 40 parts by mass or more, or 50 parts by mass or more, relative to 100 parts by mass of the rubber component. Also, for example, the amount of the component (A1) is 90 parts by mass or less, 80 parts by mass or less, 70 parts by mass or less, 60 parts by mass or less, 50 parts by mass or less, 40 parts by mass or less, or 30 parts by mass or less, relative to 100 parts by mass of the rubber component.

In the rubber composition according to the present disclosure, it is preferable that the total amount of the modified conjugated diene-based polymer (A1) and a modified conjugated diene-based polymer (A2), which will be mentioned later, should be 50 parts by mass or more relative to 100 parts by mass of the rubber component.

As a result, it is possible to distribute the filler more into the polymer phase (1) and to more highly disperse the filler into the polymer phase (1).

Modified Conjugated Diene-Based Polymer (A2)

A modified conjugated diene-based polymer (A2) is a modified conjugated diene-based polymer that is different from the modified conjugated diene-based polymer (A1). However, the component (A1) and the component (A2) are both modified conjugated diene-based polymers, and therefore, they are included in the polymer phase (1).

Examples of the conjugated diene-based polymer, which is a base polymer of the component (A2), include, for example, a polybutadiene (BR), a synthetic polyisoprene (IR), a styrene butadiene copolymer (SBR), an isoprene butadiene copolymer, an ethylene butadiene copolymer, and a propylene butadiene copolymer, which are mentioned above.

In one embodiment, the component (A2) is a modified styrene butadiene rubber.

The modified SBR as the component (A2) may be different from the component (A1), and publicly known modified SBRs can be used therefor. Examples thereof include, for example, modified SBRs described in Japanese Patent Laid-Open No. 2017-190457, International Publication No. WO 2016/194316, International Publication No. WO 2017/077712, and International Publication No. WO 2017/077714.

The modifying agent for obtaining the modified SBR as the component (A2) can be selected from publicly known modifying agents as appropriate and used. It is preferable that the modifying agent should be one or more kinds selected from the group consisting of alkoxysilane compounds, hydrocarbyloxy silane compounds, and combinations thereof because they have high interactivity with the filler (for example, silica).

Examples of the alkoxysilane compound include, for example, N-(1,3-dimethylbutylidene)-3-(triethoxysilyl)-1-propanamine, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, propyltriethoxysilane, propyltripropoxysilane, propyltriisopropoxysilane, butyltrimethoxysilane, butyltriethoxysilane, phenyltrimethoxysilane, phenyltriethoxysilane, dimethyldimethoxysilane, methylphenyldimethoxysilane, dimethyldiethoxysilane, vinyltrimethoxysilane, vinyltriethoxysilane, and divinyldiethoxysilane. Among the above, mention may be made of N-(1,3-dimethylbutylidene)-3-(triethoxysilyl)-1-propanamine, tetraethoxysilane, methyltriethoxysilane, dimethyldiethoxysilane, and the like. These alkoxysilane compounds may be used singly as one kind, or may be used in combination of two or more kinds.

Examples of the hydrocarbyloxy silane compound include, for example,
[N,N-bis(trimethylsilyl)-(3-amino-1-propyl)](methyl)(diethoxy)silane,
N1,N1,N7-tetramethyl-4-((trimethoxysilyl)methyl)-1,7heptane,
2-((hexyl-dimethoxysilyl)methyl)-N1,N1,N3,N3-2-pentamethylpropane-1,3-di amine,
N1-(3-(dimethylamino)propyl-N3,N3-dimethyl-N1-(3-(trimethoxysilyl)propyl) propane-1,3-diamine,
4-(3-(dimethylamino)propyl)-N1,N1,N7,N7-tetramethyl-4-((trimethoxysilyl) methyl)heptane-1,7-diamine,
N,N-dimethyl-2-(3-(dimethoxymethylsilyl)propoxy) ethanamine,
N,N-bis(trimethylsilyl)-2-(3-(trimethoxysilyl)propoxy) ethanamine,
N,N-dimethyl-2-(3-(trimethoxysilyl)propoxy)ethanamine, and
N,N-dimethyl-3-(3-(trimethoxysilyl)propoxy)propan-1-amine.

Examples of the modifying agent suitable for obtaining the modified SBR as the component (A2) by anionic polymerization include, for example, at least one kind of compound selected from
3,4-bis(trimethylsilyloxy)-1-vinylbenzene,
3,4-bis(trimethylsilyloxy)benzaldehyde,
3,4-bis(tert-butyldimethylsilyloxy)benzaldehyde, 2-cyanopyridine,
1,3-dimethyl-2-imidazolidinone, and 1-methyl-2-pyrrolidone.

It is preferable that the above modifying agent should be the amide moiety of a lithium amide compound used as a polymerization initiator in the anionic polymerization. Examples of such a lithium amide compound include, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methyl piperazide, lithium ethylpropylamide, lithium ethylbutylamide, lithium ethylbenzylamide, lithium methylphenethylamide, and combinations thereof. For example, the modifying agent that is the amide moiety of lithium hexamethyleneimide is hexamethyleneimine, the modifying agent that is the amide moiety of lithium pyrrolidide is pyrrolidine, and the modifying agent that is the amide moiety of lithium piperidide is piperidine.

Examples of the modifying agent suitable for obtaining the modified SBR as the component (A2) by coordination polymerization include, for example, at least one kind of compound selected from 2-cyanopyridine and 3,4-ditrimethylsilyloxybenzaldehyde.

Examples of the modifying agent suitable for obtaining the modified SBR as the component (A2) by emulsion polymerization include, for example, at least one kind of compound selected from 3,4-ditrimethylsilyloxybenzaldehyde and 4-hexamethyleneiminoalkylstyrene. It is preferable that these modifying agents, which are preferably used in emulsion polymerization, should be copolymerized during the emulsion polymerization as a monomer containing a nitrogen atom and/or a silicon atom.

The modification rate of the modified SBR as the component (A2) is, for example, 30% or more, 35% or more, or 70% or more. The higher the modification ratio, the more the filler is distributed into the polymer phase (1) when the filler includes silica, and the more the wet performance can be improved.

The Tg of the component (A2) is, for example, −40° C. or lower, −50° C. or lower, or −60° C. or lower. In addition, the Tg of the component (A2) is, for example, −70° C. or higher, −60° C. or higher, or −50° C. or higher.

The amount of the component (A2) in the rubber component may be regulated as appropriate, and for example, it is 10 parts by mass or more, 20 parts by mass or more, 30 parts by mass or more, 40 parts by mass or more, or 50 parts by mass or more, relative to 100 parts by mass of the rubber component. Also, for example, the amount of the component (A2) is 90 parts by mass or less, 80 parts by mass or less, 70 parts by mass or less, 60 parts by mass or less, 50 parts by mass or less, 40 parts by mass or less, or 30 parts by mass or less, relative to 100 parts by mass of the rubber component.

Third Polymer

A third polymer is a polymer that is different from the component (A1) and the component (A2). The third polymer may be selected as appropriate, and examples thereof include, for example, a natural rubber (NR), a polybutadiene (BR), a synthetic polyisoprene (IR), a styrene butadiene copolymer (SBR), an isoprene butadiene copolymer, an ethylene butadiene copolymer, and a propylene butadiene copolymer.

In one embodiment, the third polymer is one kind selected from the group consisting of a natural rubber, a synthetic isoprene rubber, and a butadiene rubber (high-cis BR) with a cis-1,4 content of 90% by mass or more.

In the rubber composition according to the present disclosure, it is preferable that the polymer phase (2) should comprise a natural rubber, a synthetic isoprene rubber, or a butadiene rubber (high-cis BR) with a cis-1,4 content of 90% by mass or more.

As a result, the difference in Tg between the polymer phase (1) and the polymer phase with the lowest peak temperature is large, which can ensure that these phases are incompatible.

The amount of the third polymer in the rubber component may be regulated as appropriate, and for example, it is 10 parts by mass or more, 20 parts by mass or more, 30 parts by mass or more, 40 parts by mass or more, 50 parts by mass or more, 60 parts by mass or more, or 70 parts by mass or more, relative to 100 parts by mass of the rubber component. Also, for example, the amount of the third polymer in the rubber component is 90 parts by mass or less, 80 parts by mass or less, 70 parts by mass or less, 60 parts by mass or less, 50 parts by mass or less, 40 parts by mass or less, 30 parts by mass or less, or 20 parts by mass or less, relative to 100 parts by mass of the rubber component.

<Filler>

The rubber composition according to the present disclosure comprises a filler. Examples of the filler include, for example, silica, carbon black, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate.

In one embodiment, the filler is silica and carbon black. In another example, the filler is silica.

The silica can be selected as appropriate depending on the purpose, and examples thereof include, for example, wet silica (hydrous silicate), dry silica (silicic anhydride), calcium silicate, and aluminum silicate. These silicas may be used singly as one kind, or may be used in combination of two or more kinds.

The BET specific surface area of silica may be selected as appropriate, and for example, it is 40 to 350 $m^2/g$, 80 to 300 $m^2/g$, or 150 to 280 $m^2/g$.

The BET specific surface area is a specific surface area determined by the BET method, and in the present disclosure, it refers to a value measured in accordance with ASTM D4820-93.

The proportion of silica in the filler may be regulated as appropriate, and for example, it is 50% by mass or more, 60% by mass or more, 70% by mass or more, 80% by mass or more, 90% by mass or more, or 95% by mass or more, relative to the total mass of the filler. Also, for example, the proportion of silica in the filler is 100% by mass or less, less than 100% by mass, 95% by mass or less, 90% by mass or less, 80% by mass or less, 70% by mass or less, 60% by mass or less, or 50% by mass or less, relative to the total mass of the filler.

Examples of the carbon black include, for example, high-, medium-, or low-structure carbon black with a grade, such as SAF, ISAF, ISAF-HS, IISAF, N339, HAF, FEF, GPF, or SRF. These carbon blacks may be used singly as one kind, or may be used in combination of two or more kinds.

The BET specific surface area of carbon black may be selected as appropriate, and for example, it is 40 to 350 $m^2/g$ or 80 to 200 $m^2/g$.

The proportion of carbon black in the filler may be regulated as appropriate, and for example, it is 1% by mass or more, 2% by mass or more, 3% by mass or more, 4% by mass or more, 5% by mass or more, 10% by mass or more, 20% by mass or more, or 30% by mass or more, relative to the total mass of the filler. Also, for example, the proportion of carbon black in the filler is 100% by mass or less, less than 100% by mass, 50% by mass or less, 40% by mass or less, 30% by mass or less, 20% by mass or less, 10% by mass or less, or 5% by mass or less, relative to the total mass of the filler.

The amount of the filler to be compounded may be regulated as appropriate, and for example, it is 50 to 120 parts by mass relative to 100 parts by mass of the rubber component.

In addition to the rubber component and the filler, components normally used in the rubber industry, such as a styrene alkylene block copolymer, a thermoplastic resin, a softener, a vulcanization accelerator, a silane coupling agent, a vulcanizing agent, a glycerin fatty acid ester, an age resistor, a vulcanization accelerator aid, and an organic acid compound can be selected as appropriate and contained in the rubber composition according to the present disclosure, within the range not conflicting with the spirit of the present disclosure.

(Method for Preparing Rubber Composition)

The method for preparing the rubber composition according to the present disclosure is not particularly limited, and the components, such as the rubber component and the filler, may be kneaded using publicly known kneading methods.

The rubber composition according to the present disclosure is suitably for tires, and more suitably for tire tread rubbers.

(Tread Rubber)

A tread rubber according to the present disclosure is a tread rubber using the rubber composition described above.

As a result, it is possible to highly balance the wet performance, wear resistance, low rolling resistance, and breaking resistance of the tread rubber.

(Tire)

A tire according to the present disclosure is a tire using the rubber composition described above.

As a result, it is possible to highly balance the wet performance, wear resistance, low rolling resistance, and breaking resistance of the tire.

Examples

Hereinafter, the present disclosure will be described in further detail with reference to Examples, but these Examples are intended to illustrate the present disclosure and does not limit the present disclosure in any way. The amount to be compounded refers to parts by mass unless otherwise noted.

The materials used in Examples are as follows.

Rubber Components:

Natural rubber (NR): "SIR20" (trade name) made in Indonesia;

High-cis BR: "JSR BR01® (BR01 is a registered trademark in Japan, other countries, or both)" (trade name) manufactured by JSR CORPORATION;

Modified SBR (3): "Tufdene F3440" (trade name) manufactured by Asahi Kasei Corporation, styrene content of 35.5% by mass, vinyl content of 40% by mass, weight-average molecular weight of $100 \times 10^4$, not corresponding to the component (A1) but to the component (A2). Tg=–25° C.; and Unmodified SBR: "HP755B" (trade name) manufactured by JSR CORPORATION, solution polymerized styrene butadiene copolymer, Tg=–18° C.

Fillers:

Carbon black: "#78" (trade name) manufactured by Asahi Carbon Co., Ltd.;

Silica 1: "Nipsil® (Nipsil is a registered trademark in Japan, other countries, or both) AQ" CTAB165 (trade name) manufactured by Tosoh Silica Corporation, BET specific surface area of 205; and Silica 2: CTAB79 manufactured by Tosoh Silica Corporation.

Others:

Silane coupling agent: bis(3-triethoxysilylpropyl)disulfide, "Si75" (trade name) manufactured by Evonik Industries AG;

$C_5$-$C_9$-based resin: "Quinton® (Quinton is a registered trademark in Japan, other countries, or both) G100B" manufactured by Zeon Corporation;

Zinc stearate: "307564" (product number) manufactured by Sigma-Aldrich;

Age resistor (6PPD): N-(1,3-dimethylbutyl)-N'-phenyl-p-phenylenediamine, NOCRAC 6C (trade name) manufactured by Ouchi Shinko Chemical Industrial Co., Ltd.;

Vulcanization accelerator (1) (DPG): 1,3-diphenylguanidine, "SOXINOL® (SOXINOL is a registered trademark in Japan, other countries, or both) D-G" (trade name) manufactured by Sumitomo Chemical Co., Ltd.;

Vulcanization accelerator (2) (MBTS): di(2-benzothiazolyl) persulfide, "NOCCELER® (NOCCELER is a registered trademark in Japan, other countries, or both) DM-P" (trade name) manufactured by Ouchi Shinko Chemical Industrial Co., Ltd.; and Vulcanization accelerator (3) (CBS): N-cyclohexylbenzothiazole-2-sulfenamide, "NOCCELER® (NOCCELER is a registered trademark in Japan, other countries, or both) CZ-G" (trade name) manufactured by Ouchi Shinko Chemical Industrial Co., Ltd.

For the modified conjugated diene-based polymer (A1), the bound styrene content, microstructure of the butadiene moiety, molecular weight, contracting factor (g'), Mooney viscosity, Tg, modification rate, presence or absence of nitrogen atoms, and presence or absence of silicon atoms are analyzed according to the methods mentioned above.

<Synthesis of Modified SBR (1)—Component (A1)>

A tank-type pressure vessel having a stirrer and a jacket for temperature control is used as the polymerization reactor, the pressure vessel having an internal volume of 10 L, a ratio of internal height (L) to diameter (D) (L/D) of 4.0, an inlet at the bottom and an outlet at the apex. Pre-dehydrated 1,3-butadiene, styrene, and n-hexane are mixed under the conditions of 17.2 g/min, 10.5 g/min, and 145.3 g/min, respectively. In a static mixer provided in the middle of the piping that feeds this mixed solution to the inlet of the reactor, n-butyllithium for inerting residual impurities are added and mixed at a rate of 0.117 mmol/min, and then the resultant mixture is continuously fed to the bottom of the reactor. Furthermore, 2,2-bis(2-oxolanyl)propane as the polar substance and n-butyllithium as the polymerization initiator are fed at a rate of 0.019 g/min and 0.242 mmol/min, respectively, to the bottom of the polymerization reactor where they are vigorously mixed with the stirrer to be subjected to the polymerization reaction continuously. The temperature is controlled such that the temperature of the polymerization solution at the outlet of the reactor apex is 75° C. When the polymerization is sufficiently stabilized, a small amount of the polymer solution before adding the coupling agent is extracted from the outlet of the reactor apex, the antioxidant (BHT) is added at 0.2 g per 100 g of polymer, the solvent is then removed, and the Mooney viscosity at 110° C. and various molecular weights are measured. Next, tetrakis(3-trimethoxysilylpropyl)-1,3-propanediamine diluted to 2.74 mmol/L as the coupling agent is continuously added to the polymer solution flowing out of the reactor outlet at a rate of 0.0302 mmol/min (n-hexane solution containing 5.2 ppm water). The polymer solution to which the coupling agent has been added is mixed by passing through a static mixer and undergoes coupling reaction. At this time, the time from the polymer solution flowing out of the reactor outlet until the addition of the coupling agent is 4.8 minutes, the temperature is 68° C., and the difference between the temperature during the polymerization step and the temperature until the addition of the modifying agent is 7° C. To the polymer solution that has undergone the coupling reaction, the antioxidant (BHT) is continuously added at 0.2 g per 100 g of polymer and at a rate of 0.055 g/min (n-hexane solution) to terminate the coupling reaction. At the same time as the antioxidant, the oil ("JOMO Process NC140" (trade name) manufactured by JX NIPPON OIL & ENERGY CORPORATION) is continuously added at 10.0 g per 100 g of polymer, and mixed with a static mixer. The solvent is removed by steam stripping to obtain a modified SBR (1) as the component (A1).

When the modified SBR (1) is analyzed by the methods described above, the respective values are as follows and it corresponds to the component (A1):

Bound styrene content=35% by mass;
Vinyl bond content (1,2-bond content)=42 mol %;
Mw=$85.2 \times 10^4$ g/mol;
Mn=$38.2 \times 10^4$ g/mol;
Mw/Mn=2.23;
Peak top molecular weight ($Mp_1$)=$96.8 \times 10^4$ g/mol;
Ratio between peak top molecular weights ($Mp_1$/$Mp_2$)=3.13;
Proportion of the "particular high molecular weight component"=4.6%;
Contracting factor (g')=0.59;
Mooney viscosity (100° C.)=65;
Tg=–24° C.; and
Modification rate=80%.

Also, the modified SBR (1) has a nitrogen atom and a silicon atom.

For the modified SBR (1), the "degree of branching", which corresponds to the number of branches assumed based on the number of functional groups and the amount to be added of the coupling agent, is 8 (this can also be confirmed from the value of the contracting factor), and the "number of SiOR residual groups", which corresponds to the value obtained by subtracting the number of SiOR decreased by the reaction from the total number of SiOR that one molecule of coupling agent has, is 4.

<Synthesis of Modified SBR (2)—Component (A2)>

To a dried, nitrogen-purged 800 mL pressure resistant glass vessel, a cyclohexane solution of 1,3-butadiene and a cyclohexane solution of styrene are added to reach 67.5 g of 1,3-butadiene and 7.5 g of styrene, 0.6 mmol of 2,2-di (tetrahydrofuryl)propane is added, 0.8 mmol of n-butyllithium is added, and then polymerization is carried out at 50° C. for 1.5 hours. To the polymerization reaction system in which the polymerization conversion rate at this time has reached almost 100%, 0.72 mmol of [N,N-bis(trimethylsilyl)-(3-amino-1-propyl)](methyl)(diethoxy)silane is added, and the modification reaction is carried out at 50° C. for 30 minutes. Thereafter, 2 mL of a 5 mass % solution of 2,6-di-t-butyl-p-cresol (BHT) in isopropanol is added to stop the reaction, and the resultant product is dried according to an ordinary method to obtain a modified SBR. In the microstructure of the modified SBR, the bound styrene content is 10% by mass, the vinyl bond content in the butadiene moiety is 40%, and the peak molecular weight is 200,000. In addition, Tg is −60° C.

<Preparation and Evaluations of Rubber Compositions>

According to the formulations described in Table 1 and Table 2, rubber compositions for Example 1 and Comparative Example 1 were produced using an ordinary Banbury mixer. Rubber compositions for Example 2 to Example 7 and Comparative Example 2 to Comparative Example 5 are produced using an ordinary Banbury mixer. Also, by using these rubber compositions as the tread rubber, pneumatic radial tires for passenger vehicles with a size of 195/65R15 are fabricated. For the rubber compositions or tires, the wet performance, wear resistance, low rolling resistance, and breaking resistance are evaluated according to the following methods. Each evaluation is described in Table 1.

For each rubber composition, the peak temperatures of the tan δ temperature dispersion curves of the polymer phase (1) and the polymer phase (2), the filler concentration in the polymer phase (1), and the average aggregate area of the filler in the polymer phase (1) are determined by the methods mentioned above.

<Wet Performance>

For Example 1 and Comparative Example 1, a vulcanized rubber that could fit in a measuring tool with a long diameter of 40 mm and a short diameter of 20 mm was made, and the frictional force generated when the rubber was pressed against the road surface of a fixed wet iron plate and moved back and forth was detected with a load cell, and the coefficient of dynamic friction was calculated. For Examples 2 to 7 and Comparative Examples 2 to 5, calculation is carried out.

<Wear Resistance>

After vulcanizing the rubber composition at 145° C. for 33 minutes, the wear amount is measured at 23° C. using a Lambourn abrasion tester in accordance with JIS K 6264-2:2005. The wear resistance is expressed as an index number by taking the inverse number of the wear amount and defining the value of Comparative Example 1 as 100. The larger the index number value, the smaller the wear amount and the more excellent the wear resistance.

<Low Rolling Resistance>

For Example 1 and Comparative Example 1, index numbers were calculated based on tan δ at 50° C. For Examples 2 to 7 and Comparative Examples 2 to 5, index numbers are calculated. The smaller the index number value, the lower the rolling resistance and the more excellent the low rolling resistance.

<Breaking Resistance>

For Example 1 and Comparative Example 1, the rubber compositions were subjected to a tensile test at room temperature in accordance with JIS-K6251, and from the obtained results, the breaking stresses of the vulcanized rubber compositions were calculated. The rubber compositions for Example 2 to Example 7 and Comparative Example 2 to Comparative Example 5 are subjected to a tensile test at room temperature in accordance with JIS-K6251, and the breaking stresses of the vulcanized rubber compositions are measured. Each breaking resistance is expressed as an index number by defining the value of Comparative Example 1 as 100. The larger the index number value, the more excellent the breaking resistance.

TABLE 1

| Rubber component Filler | Kinds and amounts described in Table 2 |
|---|---|
| Total oil amount | 37.5 |
| Silane coupling agent | 8% of the mass of silica |
| $C_5$—$C_9$-based resin | 10 |
| Zinc stearate | 2 |
| Age resistor | 1 |
| Stearic acid | 1 |
| Zinc flower | 2.5 |
| Vulcanization accelerator (1) | 0.8 |
| Vulcanization accelerator (2) | 1.1 |
| Vulcanization accelerator (3) | 1 |
| Sulfur | 1.9 |

TABLE 2

| | | | Example 1 | Example 2 | Example 3 | Example 4 | Example 5 | Example 6 |
|---|---|---|---|---|---|---|---|---|
| Compounding | Modified SBR (1) Tg = −24° C. | Component (A1) | 30 | 30 | 35 | 40 | 25 | 15 |
| | Modified SBR (2) Tg = −60° C. | Component (A2) | 35 | 35 | 40 | 45 | 25 | 15 |
| | Modified SBR (3) Tg = −25° C. | Component (A2) | — | — | — | — | — | — |
| | Natural rubber | Third polymer | 35 | 35 | 25 | 15 | 50 | 70 |
| | High-cis BR | Third polymer | — | — | — | — | — | — |
| | Unmodified SBR | Third polymer | — | — | — | — | — | — |
| | Carbon black | | 5 | 5 | 5 | 5 | 5 | 5 |
| | Silica 1 | | 64 | 75 | 75 | 60 | 100 | — |
| | Silica 2 | | — | — | — | — | — | 60 |
| Polymer(s) included in polymer phase (1) | | | Modified SBR(1) and modified SBR(2) | Modified SBR(1) and modified SBR(2) | Modified SBR(1) and modified SBR(2) | Modified SBR(1) and modified SBR(2) | Modified SBR(1) and modified SBR(2) | Modified SBR(1) and modified SBR(2) |

TABLE 2-continued

|  |  |  |  |  |  |  |
|---|---|---|---|---|---|---|
| Polymer(s) included in polymer phase (2) | Natural rubber | Natural rubber | Natural rubber | Natural rubber | Natural rubber | Natural rubber |
| tan δ curve peak temperature [° C.] of polymer phase (1) | −30 | −35 | −33 | −33 | −31 | −32 |
| tan δ curve peak temperature [° C.] of polymer phase (2) | −53 | −52 | −51 | −53 | −54 | −55 |
| Distribution and dispersion of filler — Number of parts of polymer(s) in polymer phase (1) [parts by mass] (a) | 60 | 65 | 75 | 85 | 50 | 30 |
| Proportion of filler distributed in polymer phase (1) [%] | 98 | 97 | 98 | 99 | 95 | 95 |
| Number of parts of filler distributed in polymer phase (1) [parts by mass] (b) | 67.62 | 77.6 | 78.4 | 64.35 | 99.75 | 61.75 |
| Filler concentration (X) in polymer phase (1) (b) ÷ (a) × 100 [%] | 113 | 119 | 105 | 76 | 200 | 206 |
| 4.8X + 1200 | 1741 | 1773 | 1702 | 1563 | 2158 | 2189 |
| Average aggregate area (Y) of filler in polymer phase (1) [nm²] | 1720 | 1585 | 1455 | 1339 | 1920 | 2050 |
| Evaluations (index number) — Wet performance | 116 | 104 | 106 | 107 | 102 | 96 |
| Low rolling resistance | 77 | 94 | 92 | 91 | 98 | 85 |
| Breaking resistance | 109 | 112 | 110 | 109 | 120 | 118 |
| Wear resistance | 109 | 110 | 107 | 106 | 111 | 117 |

|  |  |  | Example 7 | Comparative Example 1 | Comparative Example 2 | Comparative Example 3 | Comparative Example 4 | Comparative Example 5 |
|---|---|---|---|---|---|---|---|---|
| Compounding | Modified SBR (1) Tg = −24° C. | Component (A1) | 40 | — | 100 | 70 | 32 | 32 |
|  | Modified SBR (2) Tg = −60° C. | Component (A2) | 45 | 30 | — | — | — | — |
|  | Modified SBR (3) Tg = −25° C. | Component (A2) | — | — | — | — | 8 | 8 |
|  | Natural rubber | Third polymer | — | 40 | — | — | — | 30 |
|  | High-cis BR | Third polymer | 15 | — | — | 30 | 60 | 30 |
|  | Unmodified SBR | Third polymer | — | 30 | — | — | — | — |
|  | Carbon black |  | 5 | 5 | 5 | 5 | 5 | 5 |
|  | Silica 1 |  | 60 | 64 | 75 | 75 | 75 | 75 |
|  | Silica 2 |  | — | — | — | — | — | — |
| Polymer(s) included in polymer phase (1) |  |  | Modified SBR(1) and modified SBR(2) | Modified SBR(2) and unmodified SBR | Modified SBR(1) | Modified SBR(1) | Modified SBR(1) and modified SBR(3) | Modified SBR(1) and modified SBR(3) |
| Polymer(s) included in polymer phase (2) |  |  | High-cis BR | Natural rubber | None | High-cis BR | High-cis BR | Natural rubber and high-cis BR |
| tan δ curve peak temperature [° C.] of polymer phase (1) |  |  | −34 | −30 | −11 | −9 | −10 | −10 |
| tan δ curve peak temperature [° C.] of polymer phase (2) |  |  | −90 | −53 | — | −91 | −92 | −92 |
| Distribution and dispersion of filler | Number of parts of polymer(s) in polymer phase (1) [parts by mass] (a) |  | 85 | 60 | 100 | 70 | 40 | 40 |
|  | Proportion of filler distributed in polymer phase (1) [%] |  | 99 | 97 | 100 | 97 | 93 | 94 |
|  | Number of parts of filler distributed in polymer phase (1) [parts by mass] (b) |  | 64.35 | 66.93 | 80 | 77.6 | 74.4 | 75.2 |

TABLE 2-continued

|  |  |  |  |  |  |  |  |
|---|---|---|---|---|---|---|---|
|  | Filler concentration (X) in polymer phase (1) (b) ÷ (a) × 100 [%] | 76 | 112 | 80 | 111 | 186 | 188 |
|  | 4.8X + 1200 | 1565 | 1735 | 1584 | 1732 | 2093 | 2102 |
|  | Average aggregate area (Y) of filler in polymer phase (1) [nm$^2$] | 1296 | 1843 | 1635 | 1845 | 2205 | 2228 |
| Evaluations (index number) | Wet performance | 107 | 100 | 105 | 105 | 96 | 98 |
|  | Low rolling resistance | 91 | 100 | 96 | 98 | 99 | 100 |
|  | Breaking resistance | 106 | 100 | 88 | 90 | 91 | 98 |
|  | Wear resistance | 107 | 100 | 96 | 101 | 106 | 105 |

\* In Table 2, in Comparative Example 5, the natural rubber is the third polymer and the high-cis BR is the fourth polymer.

As described in Table 2, by the rubber composition according to the present disclosure, it is possible to highly balance the wet performance, wear resistance, low rolling resistance, and breaking resistance.

INDUSTRIAL APPLICABILITY

According to the present disclosure, it is possible to provide a rubber composition in which wet performance, wear resistance, low rolling resistance, and breaking resistance are highly balanced. According to the present disclosure, it is possible to provide a tire in which wet performance, wear resistance, low rolling resistance, and breaking resistance are highly balanced.

The invention claimed is:

1. A rubber composition comprising a rubber component and a filler, wherein:
   the rubber component comprises a modified conjugated diene-based polymer (A1), a modified conjugated diene-based polymer (A2), and a third polymer, which are different from each other;
   the modified conjugated diene-based polymer (A1) has a weight-average molecular weight of 20×10$^4$ to 300×10$^4$, includes a modified conjugated diene-based polymer with a molecular weight of 200×10$^4$ to 500×10$^4$ at 0.25 to 30% by mass relative to a total amount of the modified conjugated diene-based polymer (A1), and has a contracting factor (g') of less than 0.64;
   the rubber component is separated into at least two polymer phases: a polymer phase (1) with a peak temperature of a tan δ temperature dispersion curve being highest; and a polymer phase (2) with the peak temperature being lowest;
   the polymer phase (1) and the polymer phase (2) are incompatible with each other;
   the polymer phase (1) at least comprises the modified conjugated diene-based polymer (A1), the modified conjugated diene-based polymer (A2), and the filler; and
   when a concentration (%) of the filler in the polymer phase (1) is defined as X and an average aggregate area (nm$^2$) of the filler in the polymer phase (1) is defined as Y, X and Y satisfy the following formula (1):

$$Y < 4.8X + 1200 \qquad (1).$$

2. The rubber composition according to claim 1, wherein the modified conjugated diene-based polymer (A1) and the modified conjugated diene-based polymer (A2) are each a modified styrene butadiene rubber.

3. The rubber composition according to claim 1, wherein the polymer phase (2) comprises a natural rubber, a synthetic isoprene rubber, or a butadiene rubber with a cis-1,4 content of 90% by mass or more.

4. The rubber composition according to claim 1, wherein X in the above formula (1) is larger than 100.

5. The rubber composition according to claim 1, wherein a difference between glass transition temperatures (Tg) of the modified conjugated diene-based polymer (A1) and the modified conjugated diene-based polymer (A2) is 20° C. or more.

6. The rubber composition according to claim 1, wherein a total amount of the modified conjugated diene-based polymer (A1) and the modified conjugated diene-based polymer (A2) is 50 parts by mass or more relative to 100 parts by mass of the rubber component.

7. A tread rubber using the rubber composition according to claim 1.

8. A tire using the rubber composition according to claim 1.

9. The rubber composition according to claim 2, wherein the polymer phase (2) comprises a natural rubber, a synthetic isoprene rubber, or a butadiene rubber with a cis-1,4 content of 90% by mass or more.

10. The rubber composition according to claim 2, wherein X in the above formula (1) is larger than 100.

11. The rubber composition according to claim 3, wherein X in the above formula (1) is larger than 100.

12. The rubber composition according to claim 2, wherein a difference between glass transition temperatures (Tg) of the modified conjugated diene-based polymer (A1) and the modified conjugated diene-based polymer (A2) is 20° C. or more.

13. The rubber composition according to claim 3, wherein a difference between glass transition temperatures (Tg) of the modified conjugated diene-based polymer (A1) and the modified conjugated diene-based polymer (A2) is 20° C. or more.

14. The rubber composition according to claim 4, wherein a difference between glass transition temperatures (Tg) of the modified conjugated diene-based polymer (A1) and the modified conjugated diene-based polymer (A2) is 20° C. or more.

15. The rubber composition according to claim 2, wherein a total amount of the modified conjugated diene-based polymer (A1) and the modified conjugated diene-based polymer (A2) is 50 parts by mass or more relative to 100 parts by mass of the rubber component.

16. The rubber composition according to claim 3, wherein a total amount of the modified conjugated diene-based polymer (A1) and the modified conjugated diene-based polymer (A2) is 50 parts by mass or more relative to 100 parts by mass of the rubber component.

17. The rubber composition according to claim 4, wherein a total amount of the modified conjugated diene-based polymer (A1) and the modified conjugated diene-based polymer (A2) is 50 parts by mass or more relative to 100 parts by mass of the rubber component.

18. The rubber composition according to claim 5, wherein a total amount of the modified conjugated diene-based polymer (A1) and the modified conjugated diene-based polymer (A2) is 50 parts by mass or more relative to 100 parts by mass of the rubber component.

19. A tread rubber using the rubber composition according to claim 2.

20. A tread rubber using the rubber composition according to claim 3.

* * * * *